July 10, 1962 H. E. KREMER ET AL 3,043,409
PERFORATED STRUCTURAL ANGLE
Filed May 25, 1959 6 Sheets-Sheet 1
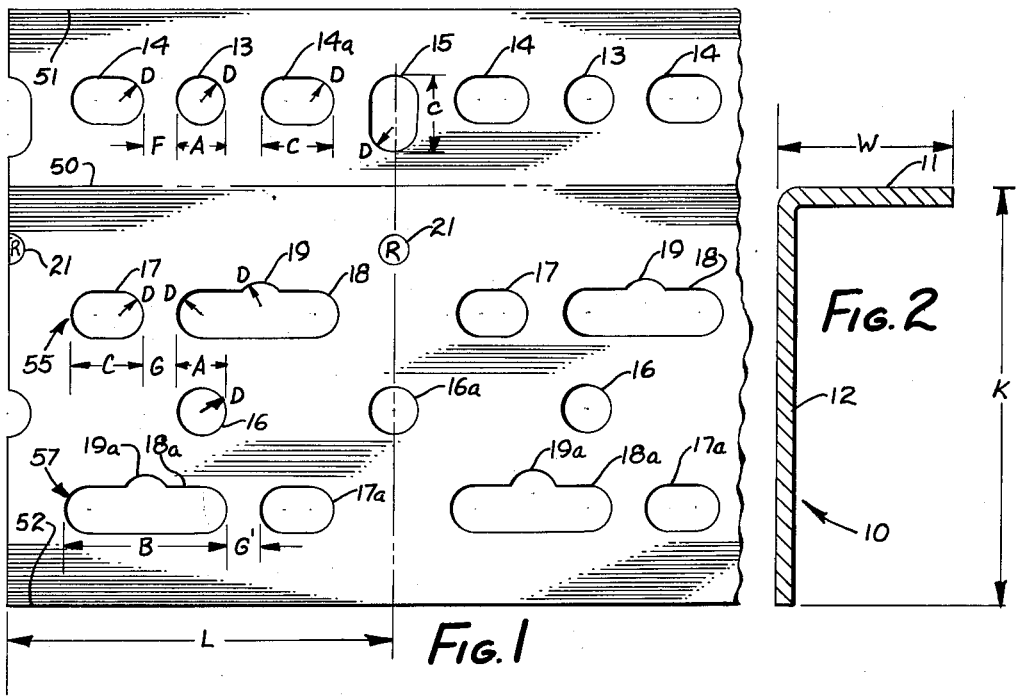
FIG. 1
FIG. 2
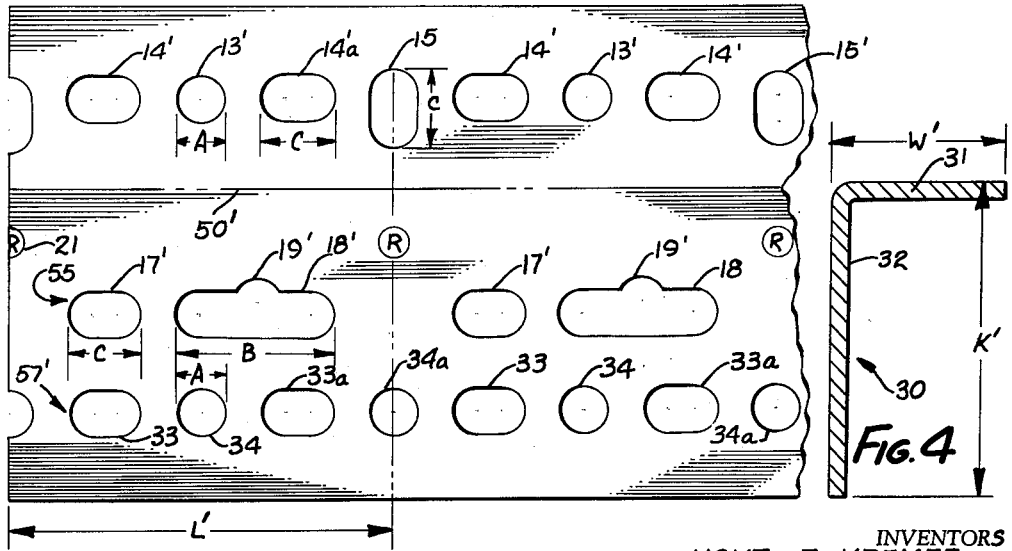
FIG. 3
FIG. 4
INVENTORS
HOYT E. KREMER
KENNETH P. DENISTY
BY
ATTORNEYS

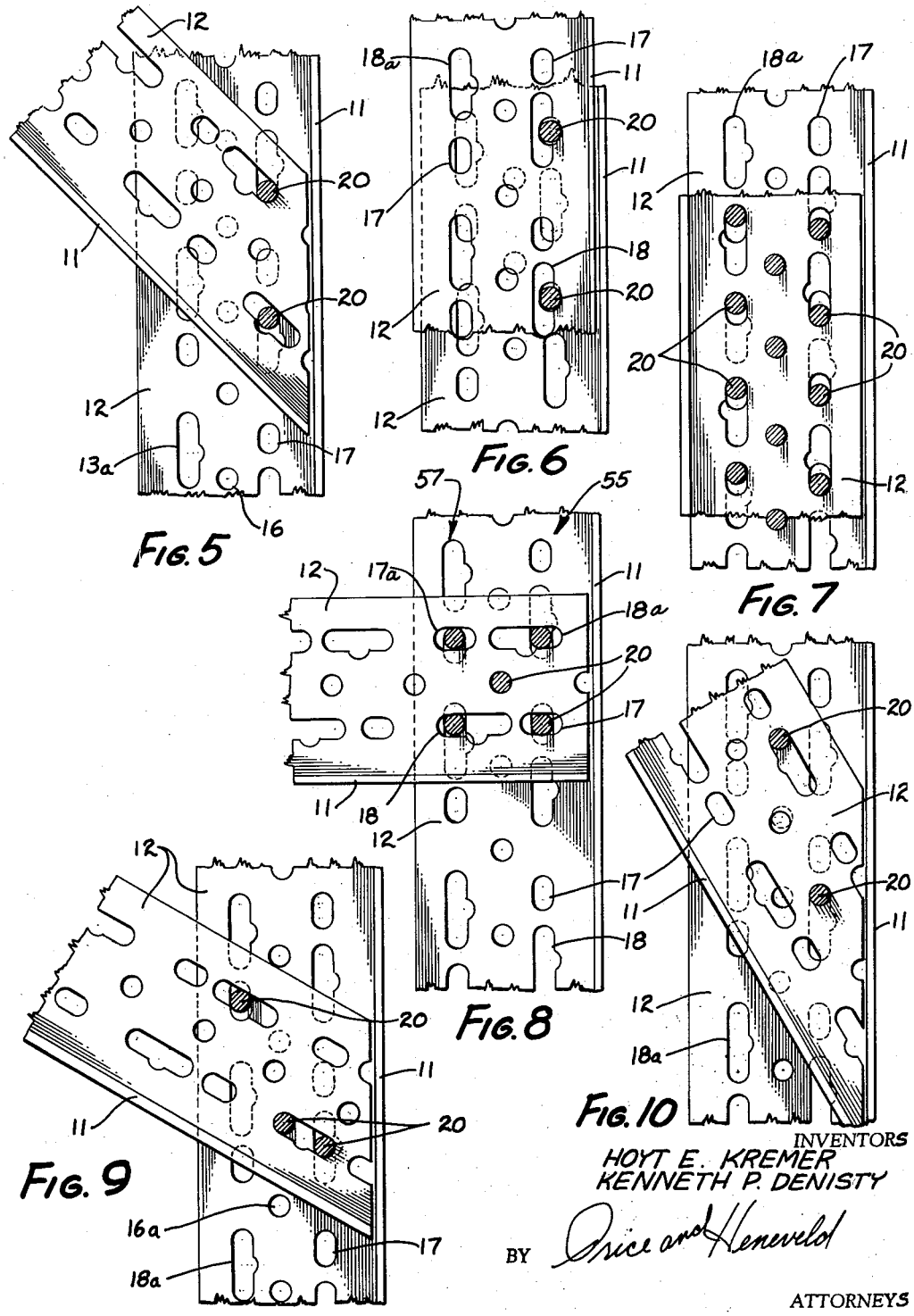

INVENTORS
HOYT E. KREMER
KENNETH P. DENISTY
BY
ATTORNEYS

INVENTORS
HOYT E. KREMER
KENNETH P. DENISTY

BY Price and Heneveld

ATTORNEYS

July 10, 1962 H. E. KREMER ET AL 3,043,409
PERFORATED STRUCTURAL ANGLE
Filed May 25, 1959 6 Sheets-Sheet 5

INVENTORS
HOYT E. KREMER
KENNETH P. DENISTY
BY Price and Heneveld
ATTORNEYS

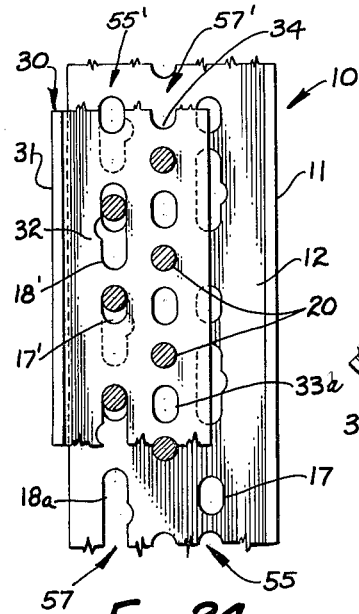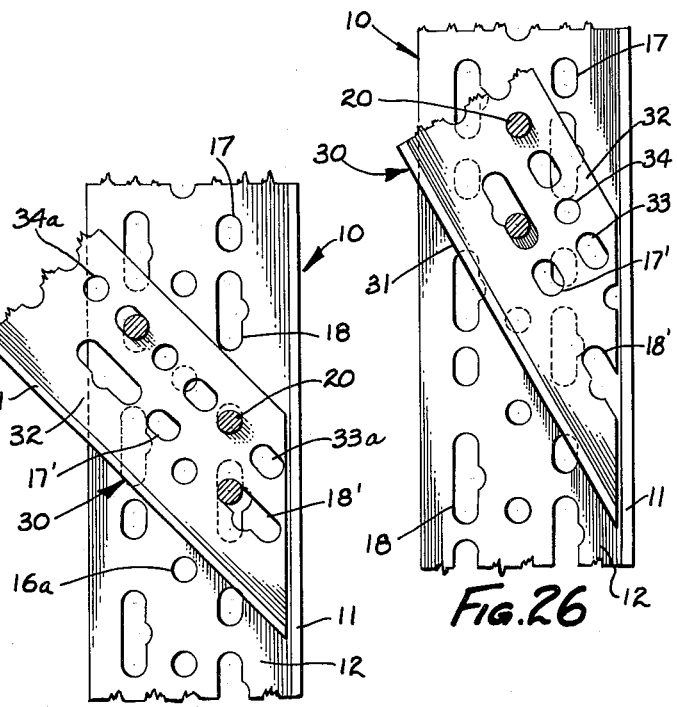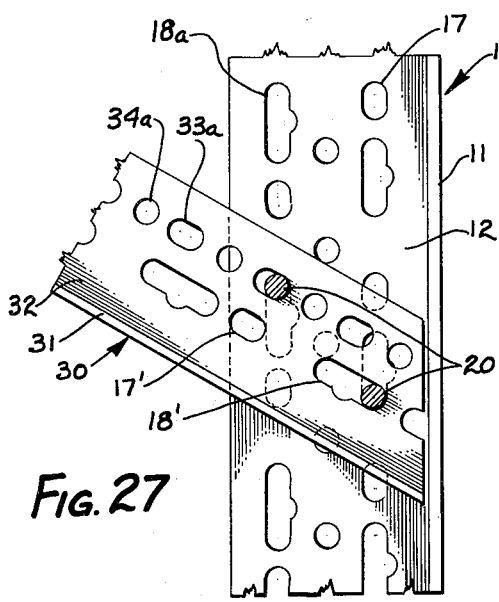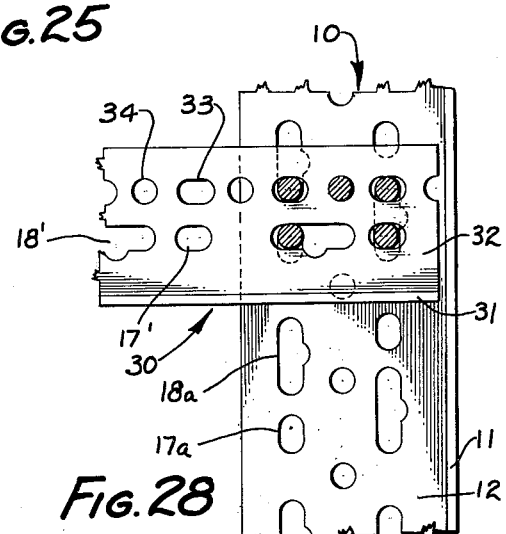

3,043,409
PERFORATED STRUCTURAL ANGLE

Hoyt E. Kremer and Kenneth P. Denisty, Grand Rapids, Mich., assignors to The Rapids-Standard Company, Inc., Grand Rapids, Mich., a corporation of Michigan
Filed May 25, 1959, Ser. No. 815,702
1 Claim. (Cl. 189—34)

This invention relates to a structural member for construction purposes, and more particularly to a slotted angle constructional member.

Previous attempts have been made to design a standardized constructional member with pre-formed holes of a given configuration and arrangement provided therein, and such as will enable securing two or more members together in a number of different ways. It is desirable that the fastener receiving holes be provided in a pattern which enables multiple linear and angular location of two such members relative to each other. At the same time, two or more fastener receiving holes should be aligned in each selected linear or angular arrangement to attain structural stability. And, still further, the fastener holes, as aligned in the selected positioning of two members to be secured together, should not allow any play or freedom which cause the structural relationship of the members to be disturbed; due to vibrational forces or for some other cause.

Aside from the need for a structural member usable with other structural members of the same kind, there is need for a structural element having all of the features mentioned and in addition being usable with a structural member of a different size and pattern than its own. This enables the use of a constructional member of greater strength, where needed, and a bracing structural member of less but adequate strength for its intended purpose, in combination. The result is a saving of material without a waste or sacrifice of structural strength.

It is an object of this invention to disclose a perforated structural angle having a pattern of perforations, or slots providing multiple arrangements with a like or similar structural angle member.

It is also an object of this invention to disclose a relatively simple arrangement of perforations which will not materially affect the structural strength of the member in which formed.

Another object of this invention is to disclose an arrangement of fastener receiving perforations for structural angle members which enables flange-to-flange and channel forming arrangement, as well as different angular relations, thereof.

Still another object of this invention is to disclose a pattern of fastener receiving perforations which may be modified within the spirit of this invention to provide structural angle members having flanges of different widths. Accordingly such angle members are of different structural strength but are still usable together.

These and other objects and advantages of this invention will be more fully appreciated and understood upon a reading of the specification which follows, taken in conjunction with the accompanying drawings, wherein:

FIGURE 1 is a flat pattern view of one of the constructural members taught by this invention.

FIGURE 2 is a cross-sectional end view of the constructional member of FIGURE 1 as formed to provide a right angle member.

FIGURE 3 is a flat pattern view of another of the constructional members taught by this invention.

FIGURE 4 is a cross-sectional end view of the constructional member of FIGURE 3 as formed to provide a right angle member.

FIGURE 5 is a fragmentary plan view of a pair of structural members including the perforation pattern of FIGURE 1, and arranged at 45° angle to each other.

FIGURE 6 is similar to FIGURE 5 and shows the structural members in an aligned and flange-to-flange relationship.

FIGURE 7 is similar to FIGURE 5 and shows the structural members in a channel forming relationship.

FIGURE 8 is similar to FIGURE 5 and shows the structural members in a 90° angular relationship.

FIGURE 9 is similar to FIGURE 5 and shows the structural members in a 60° angular relationship.

FIGURE 10 is similar to FIGURE 5 and shows the structural members in a 30° angular relationship.

FIGURE 24 is a fragmentary view of a structural member having the perforation pattern of FIGURE 1 as disposed in channel forming arrangement with a structural member having the perforation pattern of FIGURE 3.

FIGURE 25 is similar to FIGURE 24 and shows the structural members in a 45° angular relationship.

FIGURE 26 is similar to FIGURE 24 and shows the structural members in a 30° angular relationship.

FIGURE 27 is similar to FIGURE 24 and shows the structural members in a 60° angular relationship.

FIGURE 28 is similar to FIGURE 24 and shows the structural members in a 90° or right angle relationship.

Figure 11:
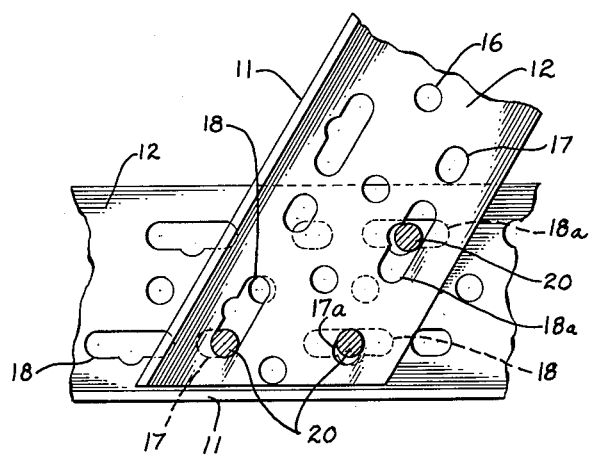
FIGURE 11 is similar to FIGURE 9 but shows different fastener receiving holes aligned for use.
Figure 12:
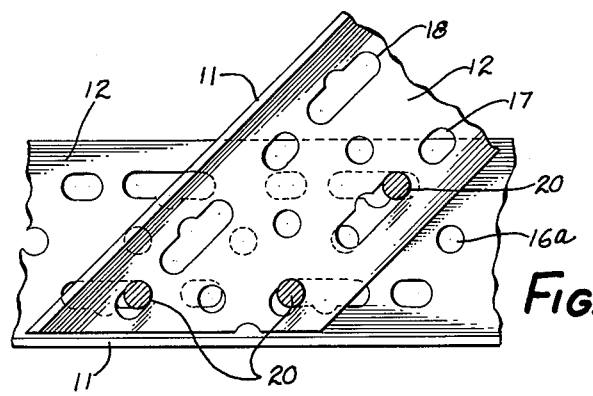
FIGURE 12 is similar to FIGURE 5, shows different fastener receiving holes aligned for use.

The structural angle members designed generally as 10 and 30 are formed by punching, stamping, or by some other method, a flat piece of metal as shown in FIGS. 1 and 3; and then bent along a bend line (shown as a center line) 50 and 50' to form an angle member as shown in FIGS. 2 and 4. The particular length of the structural angle member 10 is determined by the manufacturer in accordance with the requirements of its use. However, regardless of the overall length of the angle member, it is composed of a series of repetitious patterns of length L (FIG. 1) and L' (FIG. 3) disposed in continuous end to end relationship. Therefore, it is to be understood that long structural angle members can be cut into selected shorter lengths as desired which consist of a short series of lengths L or L'.

The first constructional form disclosed by the drawings is that shown in FIGS. 1 and 2. The structural angle member 10, shown in FIG. 2, includes flanges 11 and 12 at right angles to each other. Both flanges extend the full length of the structural member 10, and flange 12 is of a greater width than flange 11, or W is greater than W'. W is the width of the flange 12 and W' is the width of the flange 11.

Flange 11 of the structural member 10 is formed to include a series of holes, slots, or perforations 13, 14, 14a and 15. The edges of these perforations 13, 14, 14a and 15 are equally spaced apart. The ends of each has the same radius of curvature D. The opening 13 is a round hole having a diametric dimension A, which is twice D. The openings 14, 14a and 15 are similar in size and shape, and are oblong with an end-to-end dimension C which is less than twice times dimension A.

In some instances the diameter of the hole 13 is increased to provide for a larger fastener to increase the strength properties of a connection.

The oblong opening or slot 15 is disposed transversely of the length L of the flange 11 and is at a right angle relation to slot 14. The edges of the openings 13, 14, 14a and 15 are equally spaced from the outer edge 51 of flange 11, but the transversely disposed slot 15 is formed to have its inner edge extend closer to the inner edge or bend line 50 of flange 11 than the other openings.

The distance that the slot 15 extends inwardly of the other openings 13 and 14 is dependent upon the thickness of the material used to form the structural member 10. This will be later appreciated as allowing overlapping flanges 11, of different structural members 10, to be secured together by fasteners extending through a receptive pair of openings 15 despite an offset relation due to the thickness of the flanges 11.

Since the slot 15 has a dimension D, related to the size of openings 14, 14a and 13, as well as the thickness of the material in which it is formed, it follows that all dimensions given for the perforations that have been mentioned or are hereafter mentioned are also interrelated to the material thickness.

The openings 13, 14, 14a and 15 are arranged in groups of two slots 14 and 14a with a hole 13 therebetween, and with the transversely disposed slots 15 between each group of slots and holes 14, 14a and 13.

Flange 12 of the structural member 10 is formed to include a more intricate pattern of perforations. There is principally a first and second row of perforations 55 and 57, respectively, in parallel spaced relation to each other. A secondary series of perforations or holes 16 and 16a are provided between the rows just mentioned.

In certain instances the diameter of the holes 16 and 16a is increased to provide for a larger fastener and thereby increase the strength properties of a connection.

The rows of perforations just mentioned in flange 12 include a short oblong slot 17 similar in shape and size to the slots 14, 14a and 15 of flange 11. These slots have the same dimension end-to-end opening designated C and the same radius of curvature D at their ends. The rows also include longer and elongated slots 18 and 18a having an end-to-end dimension B which is approximately, but less than, four times the dimension A of the round holes 13 in flange 11. More precisely, the dimension B is equal to the dimensions A plus C and the space F provided between the openings 13 and 14 in flange 11.

The slots 17, 18 and 17a, 18a in the different rows 55 and 57 of flange 12 are disposed in pairs and are in reversed relation in the different rows. They are respectively spaced with their facing end edges a distance G and G', respectively, less than the distance C apart, and collectively (G plus G') with their facing end edges less than the distance B apart. Actually, they extend together over a space equal to that space occupied by the group of slot 14, hole 13, slot 14a and the spaces therebetween relationship in flange 11. Furthermore, they are in parallel spaced relationship relative to such grouping on flange 11 and have their centers of outer end curvature aligned with the centers of the outer ends of the slots 14 and 14a of such group. The center of curvature of the inner end of the elongated slots 18 and 18a will also be noted as aligned with the center of the hole 13. These center line relations are shown in FIG. 1 in the flat pattern of the structural member 10.

The rows of slots 55 and 57 are spaced apart in flange 12 a distance equal to less than the end-to-end dimension of a pair of the slots 17, 18 and the space G in between. Accordingly, as will be shown, fastener bolts or the like 20 may be extended through overlapping slots 17 and 18 when a pair of the structural members are disposed at right angles to each other, as shown in FIG. 8.

Round bolts or other fastener receptive holes 16 and 16a are shown disposed in equally spaced relation between the rows of slots 55 and 57. A hole 16 is provided centrally between the end edges of the rows 55 and 57 of slots 17, 18 and 17a, 18a as arranged in pairs and also a hole 16a between the end edges of pairs of the slots 17, 18 and 17a, 18a. This causes the hole 16 to lie on the center line through the center of curvature of the inner ends of the elongated slots 18 and 18a and the hole 13 in flange 11. The other hole 16a lies on the center line through the centers of curvature of the ends of the transverse slot 15 in flange 11.

The elongated slots 18 and 18a include, in each instance, a semicircular offset 19 and 19a at the inner side thereof. Accordingly, the slots 18 and 18a have the appearance of, and may be called, T slots. The offsets 19 and 19a of the T slots 18 and 18a are of a size suitable for receiving a fastener bolt 20 partially therewithin. The offset 19 or 19a is centered between the ends of the slot 18 or 18a. As will be shown, this offset enables a securing tie between structural members in flange-to-flange aligned and angularly adjusted relations.

A reference mark 21 is provided on flange 12, and includes an imprinted R with a circle around it. This mark, or the like, is provided at regularly spaced intervals and runs with the pattern of slots or perforations in the slotted angle bars. If the run of the pattern is every 3 inches, for example, it is a simple matter to measure any required length of the angle bar right on the bar itself.

The more commonly used angular and aligned relations of a pair of slotted angle bars 10 are shown by FIGS. 5–13.

In FIG. 5 the structural angle members 10 are shown as engaged together at a 45° angle to each other. Two fastener bolts 20 are shown as extended through the elongated slots 18 of the bottom member and 18, 18a of the top angle member. FIG. 11 shows another 45° angle connection in which three bolts 20 may be used. Elongated slots 17, 18 and 18a on the bottom member and 17a, 18 and 18a on the top member are used.

FIG. 6 shows the flange-to-flange arrangement of a pair of the structural members 10. This arrangement enables extending the length of one of the structural members, whenever required. The bolts 20 are shown as received through the offset portion 19 of the elongated slots 18 in the nested structural member and through the shorter slots 17 in the other member. The bolts are also receivable within the ends of the elongated slots 18 of the other member.

FIG. 7 shows a multiplicity of bolt fastener connections possible in the channel forming arrangement of two structural members.

The right angle arrangement of two structural members 10 is shown in FIG. 8. As mentioned, since the elongated hole 18 and shorter hole 17, in combination, overlap the two rows 55 and 57 of perforations or slots, there are many possible bolt hole connections. This is also true of the elongated hole 18a and the shorter hole 17a.

FIG. 9 shows one of the possible arrangements of the structural members 10 to form a 60° angle. Three bolts 20 are usable in this arrangement. Another three bolt arrangement is shown in FIG. 11.

Figure 13:
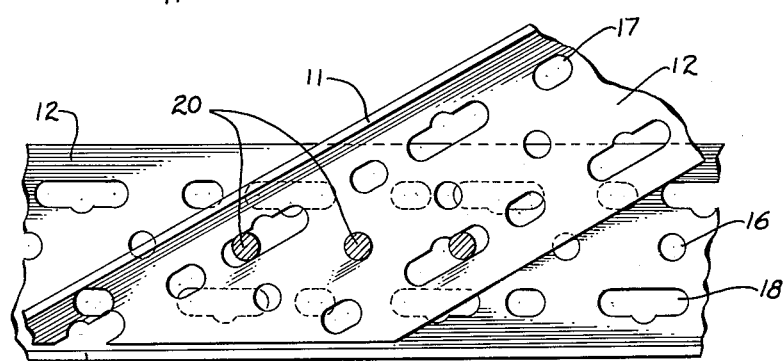
FIGURE 13 is similar to FIGURE 10 but shows different fastener receiving holes aligned for use.

FIGS. 10 and 13 show different arrangements to provide a 30° angle between two structural members. In FIG. 10 there are two bolts used and in FIG. 13 three bolt fasteners are used.

An overlay of two of the structural members 10 will show that they may be secured together in almost every conceivable angular relation and that at least two bolt fasteners may be used in each instance.

The second constructional form disclosed by the drawings is that of FIGS. 3 and 4. The structural angle member 30, shown in FIG. 4, includes flanges 31 and 32 at right angles to each other. Both flanges extend the full length of the structural member 30 and flange 32 is formed wider than flange 31, or K' is greater than W'. The flange 31 has a width W', and flange 32 has a width K'.

Flange 31 includes the same pattern of equally spaced holes and slots as disclosed in regard to the structural member 10 of FIGS. 1 and 2. Such openings, in flange 31, are designated 13', 14', 14a', and 15' to distinguish them from the others and still retain their identity thereto.

Flange 32 of the structural member 30 is formed to include a different pattern of perforations. In this instance, there are only two parallel spaced rows of perforations 55' and 57'. The innermost row 55' includes pairs of short and longer or elongated slots 17' and 18', as used with the structural member 10. Slots 18' even include an offset 19' and may be termed T slots. Their spacing, relative to each other, is the same and accordingly the suffix marks are again used to distinguish these openings from those of the structural member 10, while still retaining their identity thereto. The other row of perforations is different and will therefore be described in further detail.

The outermost row of perforations in flange 32 includes an equally spaced series of alternate oblong slots 33 and 33a and round slots or holes 34 and 34a. Such openings 33, 33a and 34, 34a are disposed in parallel spaced relation to the row of openings 17' and 18' and a distance apart therefrom equal to half the distance between the rows 55 and 57 of paired slots 17, 18 and 17a, 18a in the structural member 10. A group of an oblong slot 33, a round hole 34, a slot 33a and the spaces therebetween span a distance equal to that covered by a short slot 17' and its elongated mate 18' and the space therebetween. Further, such a grouping is disposed in parallel spaced and edge end alignment with the pair of slots 17' and 18'. The opening 34a, between each group of openings in the outer row, is centered between groups and relative to the pairs of openings 17' and 18' inwardly thereof.

The slots 33 and 33a are of the same size, shape and dimension as the oblong slots 14, 14' and 14a' in flange 31. They are also the same as slots 17'. This dimension is denoted as C' in FIG. 3. The round holes 34 and 34a are the same size as the holes 13' in the outer flange, denoted as A'. Slots 33 and 33a and a hole 34 are in complementary spaced relation below the slots 17' and 18', as mentioned, and are also identical to the group of slots 14' and 13' in flange 31. The holes 34a are aligned with the transverse slots 15' in flange 31 and are centered between the end edges of the slots 33 and 33a.

Reference marks 21 are used on the structural member 30, as on the structural member 10.

In FIGS. 14–23 there are shown several of the different angular and linear relations of two structural members 30 which are possible.

Figure 14:
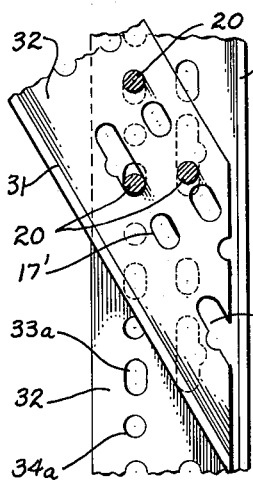
FIGURE 14 is a fragmentary plan view of a pair of structural members including the perforation pattern of FIGURE 3 and arranged at a 30° angle to each other.
Figure 23:
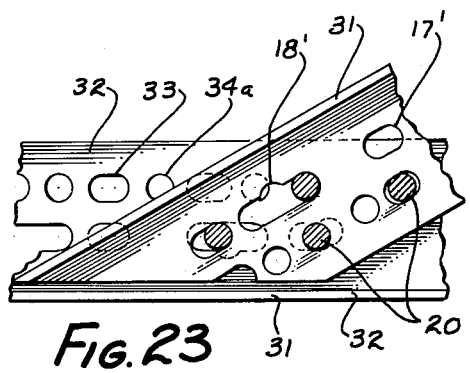
FIGURE 23 is similar to FIGURE 14 but shows different fastener receiving holes aligned for use.

In FIGS. 14 and 23 two different arrangements of structural members 30, at a 30° angle to each other, shows two different bolt hole alignment patterns. In FIG. 14 three bolts 20 are used, and in FIG. 23 there are four possible bolt positions.

Figure 15:
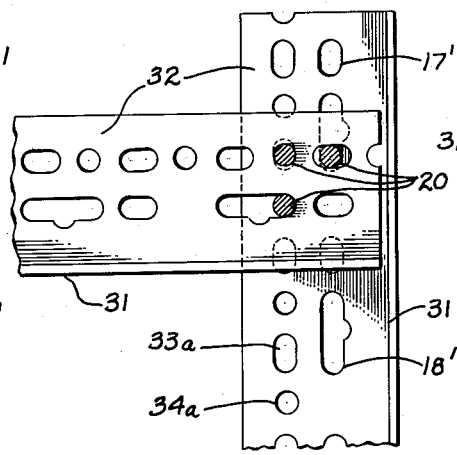
FIGURE 15 is similar to FIGURE 14 and shows the structural members in a 90° angular relationship.
Figure 20:
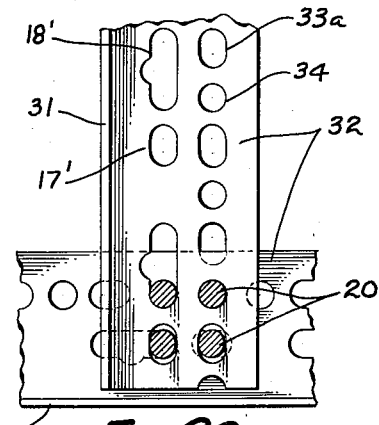
FIGURE 20 is similar to FIGURE 15 but shows different fastener receiving holes aligned for use.

In FIGS. 15 and 20 two different 90° arrangements are shown for members 30. Both can receive as many as four bolt fasteners 20.

Figure 16:
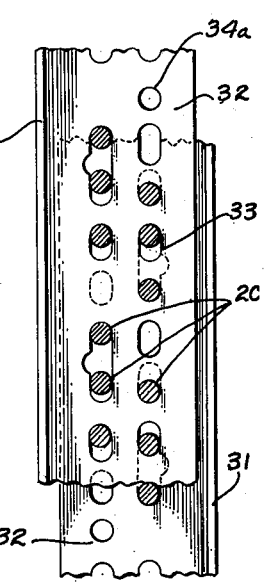
FIGURE 16 is similar to FIGURE 14 and shows the structural members in an axially aligned and channel forming relationship.

In FIG. 16 there are shown the many bolt connections possible in the channel forming arrangement of two structural members.

Figure 17:
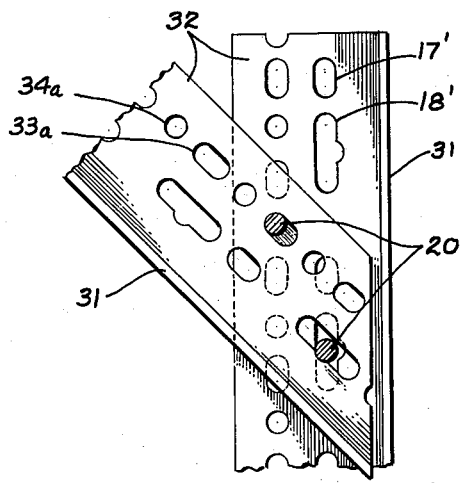
FIGURE 17 is similar to FIGURE 14 and shows the structural members in a 45° angular relationship.
Figure 22:
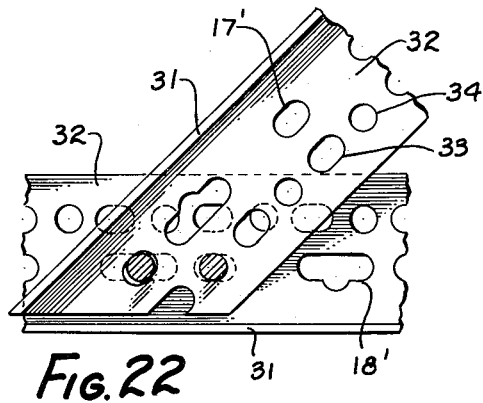
FIGURE 22 is similar to FIGURE 17 but shows different fastener receiving holes aligned for use.

FIGS. 17 and 22 show two different 45° angle forming relationships with respect to members 30.

Figure 18:
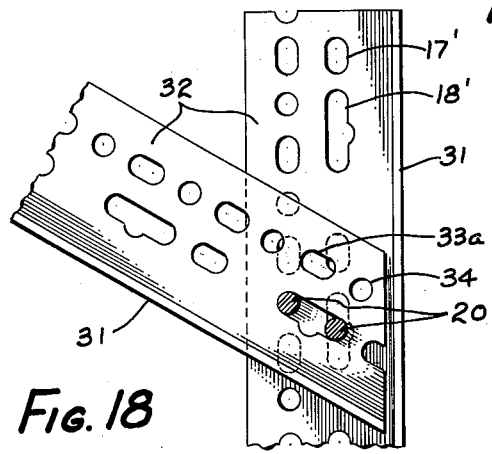
FIGURE 18 is similar to FIGURE 14 and shows the structural members in a 60° angular relationship.
Figure 21:
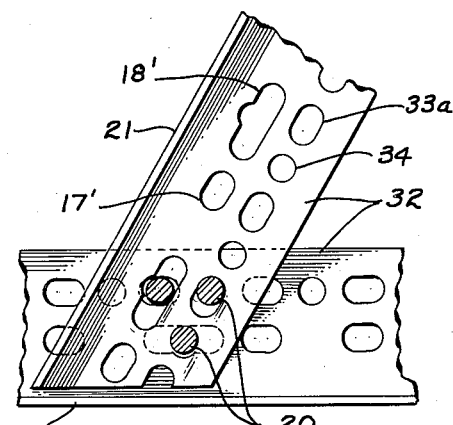
FIGURE 21 is similar to FIGURE 18 but shows different fastener receiving holes aligned for use.

FIGS. 18 and 21 show different 60° angle forming positions of members 30. In the first instance two bolts 20 are used and in the latter three bolt fasteners are used.

Figure 19:
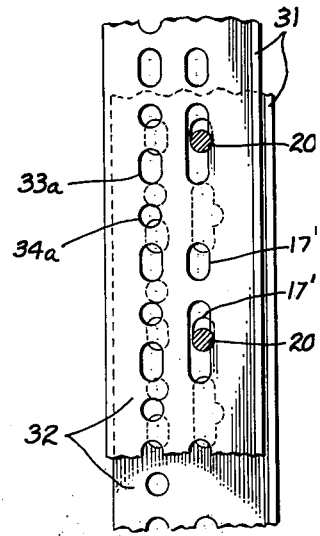
FIGURE 19 is similar to FIGURE 14 and shows the structural members in an axially aligned and flange-to-flange relationship.

FIG. 19 depicts the flange-to-flange arrangement of two of the structural members 30. The bolt fasteners 20 are seen to extend through the offset 19' in the elongated holes 18' of the nested angle member 30.

The perforations formed in structural members 10 and 30, where of a similar size and shape, may be used in combination, as shown in FIGS. 24–28. In the instances shown, the larger structural member 10 is used as an upright member and the relatively smaller size member 30 is used as a cross brace member. This, of course, is not intended to indicate any limitation as regards the use of the structural member 30. Rather, it is to show that the two constructional members may be used together with a savings in weight and material.

FIG. 24 shows the two members 10 and 30 disposed to form a channel section. One of the parallel rows of openings 55' or 57' in the smaller member 30 overlays the openings in one of the principal rows 55 or 57 of paired openings 17, 18 and 17a, 18a of the larger structural member 10 and the secondary row of holes 16 and 16a thereof. As shown, there is provision for receiving the bolts 20 in a number of different locations.

FIG. 25 shows a 45° angular relationship with three bolt fasteners 20.

FIG. 27 shows a 60° angular relationship of the structural members 10 and 30, with two bolt fasteners 20.

FIG. 28 shows a right angle arrangement of members 10 position of the elements that is shown.

The structural members 10 and 30 may also be disposed in flange-to-flange arrangement. Although this arrangement is not shown specifically, it is quite obvious by reference to FIG. 24 that the smaller member 30 will nest in either close or spaced flange-to-flange relation on member 10. In the close flange relationship the offset 19' of the smaller member 10 will be used in the manner previously mentioned.

Although a great number of different combinations of members 10 and 30 with each other, and together, have been shown, these are not intended to be any indication of the limitations of the relationship possible with such members. Rather, it is intended to show the great universality of such members for any chosen use.

While a preferred embodiment of this invention has been described, it will be understood that other modifications and improvements may be made thereto. Such of these modifications and improvements as incorporate the principles of this invention are to be considered as included in the hereinafter appended claim unless this claim, by its language, expressly states otherwise.

We claim:

A constructional element for structural framing and other purposes, and comprising: a right angle member of extended length and capable of being cut to selected shorter lengths as desired, said right angle member having, in cross section, a wide flange and a narrow flange, said wide flange having a repetitious pattern of oblong slots arranged in a first row of slots and extending the length thereof, said first row having pairs of alternately short and longer slots, each of said pairs of slots being spaced apart from each adjacent pair of said slots in said first row less than the length of the longer of said slots, the slots of each of said pair being spaced apart less than the length of the shorter of said slots, the longer of said slots at their centers each being enlarged crosswise of said constructional element; a second row of openings in said wide flange, said openings of said second row being alternately circular and elongated, with the elongated ones of said slots being of the same length as the shorter of said slots of said first row with alternate ones of said elongated slots of said second row being aligned with the said shorter ones of said slots of said first row crosswise of said constructional element, said circular ones of said openings being equally spaced from adjacent ones of said elongated slots of said second row; alternate ones of said circular openings of said second row being positioned lengthwise of said wide flange midway between adjacent pairs of slots in said first row; a third row of openings in said narrow flange, said third row of openings having a repetitive design of a group of openings, each group consisting of a pair of slots elongated lengthwise of said narrow flange with a circular opening midway therebetween, the length of each of said groups being the same as the length of one of said pairs of alternately short and longer slots of said first row of said wide flange and aligned therewith crosswise of said constructional element; said third row of openings also having elongated slots with their greater axis arranged crosswise of said narrow flange, one being equally spaced between adjacent ones of said groups of slots and aligned crosswise of said constructional element with said alternate ones of said circular openings of said second row of said wide flange.

References Cited in the file of this patent

UNITED STATES PATENTS

| | | |
|---|---|---|
| 2,746,780 | Comine | May 22, 1956 |

FOREIGN PATENTS

| | | |
|---|---|---|
| 166,195 | Australia | Dec. 2, 1955 |
| 1,101,469 | France | Apr. 20, 1955 |
| 1,110,138 | France | Oct. 5, 1955 |